Sept. 13, 1938. R. E. GOODENOUGH 2,130,232
DUST-COLLECTING ATTACHMENT
Filed May 28, 1937
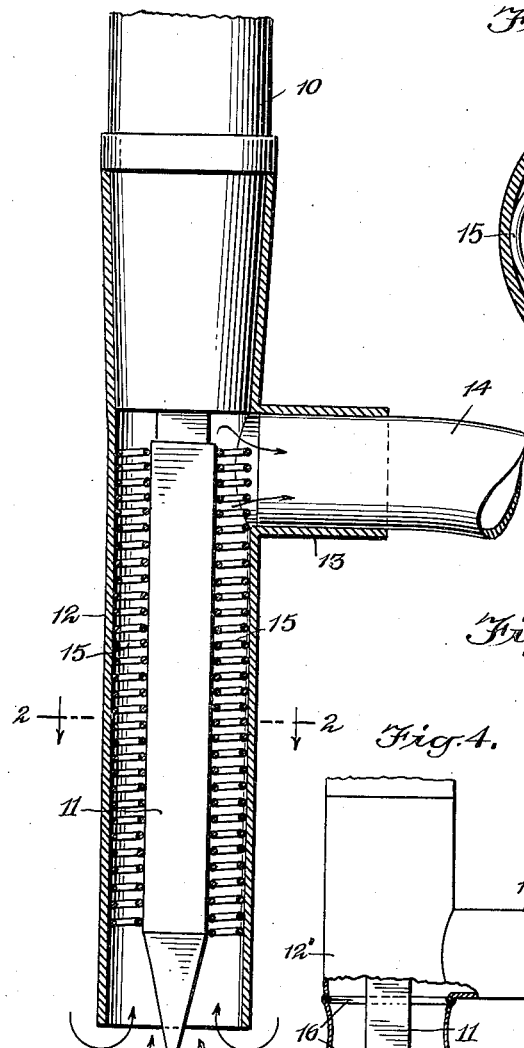
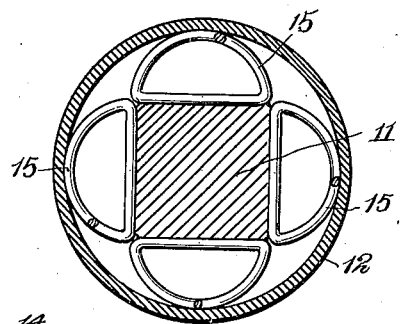
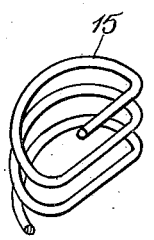
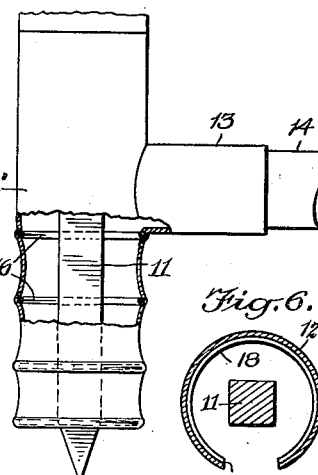
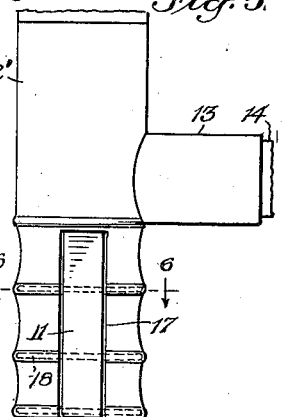
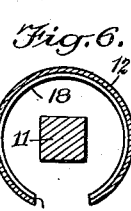
INVENTOR
Russell Edward Goodenough
BY
Munn Anderson & Liddy
ATTORNEYS

Patented Sept. 13, 1938

2,130,232

UNITED STATES PATENT OFFICE 2,130,232

DUST-COLLECTING ATTACHMENT

Russell Edward Goodenough, Northfield, Vt., assignor to Cross Brothers Company, Incorporated, Northfield, Vt., a corporation of Vermont Application May 28, 1937, Serial No. 145,203

2 Claims. (Cl. 255—50)

This invention relates to dust collecting attachments and more specifically to an attachment for pneumatic tools, such as stone cutting tools, the object of the invention being to provide an attachment which can be easily and quickly located in position on a pneumatic tool enclosing the chisel or cutting implement thereof, and operatively connected to a source of suction so that dust created by the action of the tool will be drawn away and deposited in a suitable container.

The invention consists in novel features of construction and combinations and arrangements of parts, all of which will be more fully hereinafter described and pointed out in the claims.

In the accompanying drawing—

Fig. 1 is a view showing my improved attachment in longitudinal section and in operative position on a pneumatic tool;

Fig. 2 is an enlarged view in transverse section on the line 2—2 of Fig. 1;

Fig. 3 is a fragmentary perspective view of a portion of one of the springs employed in the device;

Fig. 4 is a view in elevation partly broken away, illustrating a modification;

Fig. 5 is a view in elevation illustrating another modification; and

Fig. 6 is a view in transverse section on the line 6—6 of Fig. 5.

10 represents the body of a pneumatic tool, such for example as is employed in the cutting of stone, and 11 represents the ordinary chisel or cutting tool which is removably connected to the body 10.

My improved attachment includes a tubular member 12 which is of soft rubber and which is of appreciably greater diameter than the chisel 11. This tubular member 12 is provided with a laterally extending nipple 13 adapted to be operatively connected to a flexible tube 14 through which latter air is sucked by any suitable means. As the tubular member 12 is of soft rubber, it can be easily and quickly positioned over the end of the body portion 10 of the pneumatic tool and will securely grip the same and form an airtight juncture therewith.

The main portion of the tubular member 12 encloses the chisel 11 and extends approximately to the end of the chisel so that when the chisel is employed to cut a stone, the dust will be sucked through the tubular member and connected tube 14 to carry away the dust to any suitable receptacle (not shown).

It is the practice of stonecutters to grip the chisel 11 with the thumb and a finger, or with the thumb and all of the fingers of the hand, to guide the chisel in its work. With my improved attachment on the chisel such gripping action would tend to collapse the tubular member 12, and to prevent any possibility of this collapsing of the tubular member to interfere with the suction of air therethrough I provide a series of springs 15 which in the present instance constitute coil springs which are of general semi-circular shape in cross section, the flattened portions of the springs bearing against the chisel 11 and the rounded portions engaging the inner faces of the tubular member 12.

In the modification illustrated in Fig. 4 of the drawing the tubular member is provided with a series of rings 16 which are secured in the tubular member in any desired manner and may be embedded or partially embedded therein. These rings prevent lateral collapse of the tubular member and yet permit the tubular member a certain amount of longitudinal adjustment.

In the modification illustrated in Figs. 5 and 6 of the drawing the tubular member 12' is provided with a longitudinal slot 17 through which the tool 11 may be observed during the cutting or drilling operation. In this form of the invention the strengthening members 18 corresponding to the rings 16 are not complete rings but are only partial rings as clearly illustrated in Fig. 6 of the drawing.

It is, of course, well within the scope of the invention to modify the shape and arrangement of the springs and either to secure them permanently in the tubular member or to have them removable, and I do not wish to limit myself in this particular.

While I have illustrated and described what I believe to be a preferred embodiment of my invention, it is obvious that various changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. A dust collecting attachment for pneumatic tools, comprising a tubular member of soft rubber adapted to be positioned over the lower end of the body portion of a pneumatic tool and firmly grip the same with an airtight joint, the lower portion of said tubular member enclosing the chisel or cutting tool which is connected to the body of the tubular member, a nipple on the tubular member adapted to be connected to a flexible suction hose, and springs located in the tubular member and between the sides of the chisel and the wall of the tubular member preventing collapse of the tubular member by a hand gripping the same, said springs constituting coil springs having flattened inner faces engaging the chisel and rounded outer portions engaging the inner face of the tubular member.

2. A dust collecting attachment for pneumatic tools, comprising a tubular member of soft rubber adapted to be positioned over the lower end of the body portion of a pneumatic tool and firmly grip the same with an airtight joint, the lower portion of said tubular member enclosing the chisel or cutting tool which is connected to the body of the tubular member, a nipple on the tubular member adapted to be connected to a flexible suction hose, and springs located in the tubular member and between the sides of the chisel and the wall of the tubular member with portions of each spring bearing against said tool and opposite portions bearing against said tubular member for preventing collapse of the tubular member by a hand gripping the same.

RUSSELL EDWARD GOODENOUGH.